United States Patent
An (10) Patent No.: US 10,394,071 B2
(45) Date of Patent: Aug. 27, 2019

(54) DISPLAY PANEL AND DISPLAY DEVICE

(71) Applicant: Shenzhen China Star Optoelectronics Technology Co., Ltd., Shenzhen, Guangdong (CN)

(72) Inventor: Liyang An, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 25 days.

(21) Appl. No.: 15/736,309

(22) PCT Filed: Nov. 8, 2017

(86) PCT No.: PCT/CN2017/109997
§ 371 (c)(1),
(2) Date: Dec. 14, 2017

(87) PCT Pub. No.: WO2019/056522
PCT Pub. Date: Mar. 28, 2019

(65) Prior Publication Data
US 2019/0086716 A1    Mar. 21, 2019

(30) Foreign Application Priority Data
Sep. 20, 2017 (CN) .......................... 2017 1 0849113

(51) Int. Cl.
*G02F 1/1335* (2006.01)
*G02F 1/1343* (2006.01)

(52) U.S. Cl.
CPC .. *G02F 1/133512* (2013.01); *G02F 1/134309* (2013.01); *G02F 2001/134345* (2013.01); *G02F 2201/121* (2013.01); *G02F 2201/123* (2013.01)

(58) Field of Classification Search
CPC ................................................. G02F 1/133512
See application file for complete search history.

(56) References Cited

U.S. PATENT DOCUMENTS

| | | | | |
|---|---|---|---|---|
| 6,208,394 B1* | 3/2001 | Tanaka | .............. | G02F 1/133512 349/106 |
| 2011/0141413 A1* | 6/2011 | Sakai | .................... | G02B 5/003 349/110 |
| 2015/0362776 A1* | 12/2015 | Jikumaru | .............. | H01L 27/124 349/12 |
| 2016/0299379 A1* | 10/2016 | Sun | .................... | G02F 1/136286 |

(Continued)

*Primary Examiner* — Sang V Nguyen
(74) *Attorney, Agent, or Firm* — Andrew C. Cheng (57) ABSTRACT

A display panel includes a plurality of pixel units arranged in an array and each including a light transmitting zone and a light shielding zone arranged on a circumference of the light transmitting zone. The display panel includes a first substrate and a second substrate opposite to each other. The first substrate includes a black matrix and a first common electrode covering the black matrix. The black matrix is arranged in the light shielding zone. The second substrate includes a plurality of main pixel electrodes, which correspond, in a one-to-one manner, to the pixel units and face exactly to the light transmitting zones. In each individual pixel unit, the black matrix has edges facing the light transmitting zone and provided with notches. The first common electrode has a first portion that covers the notches and flush with a second portion thereof located in the light transmitting zone.

20 Claims, 10 Drawing Sheets (56) References Cited

U.S. PATENT DOCUMENTS

| | | | |
|---|---|---|---|
| 2016/0377942 A1* | 12/2016 | Cheng | G02F 1/133512 |
| | | | 349/110 |
| 2017/0038653 A1* | 2/2017 | Xu | G02F 1/1335 |
| 2017/0146869 A1* | 5/2017 | Hirosawa | G02F 1/133512 |
| 2018/0095314 A1* | 4/2018 | Cheng | G09G 3/3655 |
| 2018/0149933 A1* | 5/2018 | Wang | G02F 1/134363 |
| 2018/0211079 A1* | 7/2018 | Liu | G06F 3/041 |
| 2018/0224704 A1* | 8/2018 | Shao | G02F 1/133512 |
| 2018/0329261 A1* | 11/2018 | Chen | G02F 1/134309 |
| 2019/0004641 A1* | 1/2019 | Huang | G06F 3/0412 |

* cited by examiner

DISPLAY PANEL AND DISPLAY DEVICE

CROSS REFERENCE TO RELATED APPLICATIONS

This application claims the priority of Chinese Patent Application No. 201710849113.2 filed on Sep. 20, 2017, titled "Display Panel and Display Device", the disclosure of which is incorporated herein by reference in its entirety.

BACKGROUND OF THE INVENTION

1. Field of the Invention

The present invention relates to the field of display devices, and more particularly to a display panel and a display device.

2. The Related Arts

The liquid crystal display panel industry has been developed for decades. The vertical alignment (VA) display mode is a common display mode of thin-film transistor liquid crystal displays (TFT-LCDs) for large-scale televisions due to advantages including wide view angle, high contrast, and requiring no rubbing alignment. Contrast is assessed according to the ratio between the brightness levels of the brightest condition and the darkest condition. The contents of a displayed image is displayed through differences between pixels and the simplest one of differences is "brightness" and "darkness", and the larges a difference between the two, the better that a person may perceive. The human eye pupils will constrict or dilate in response to environmental illumination in order to control the amount of light entering the eyes. Within a normal range of illumination, when the illumination of the surrounding environment get brighter, the human pupils constrict to reduce the amount of entering light, and oppositely, when the illumination of the surrounding environment gets less bright, the pupils dilate to allow a larger amount of light to enter. Thus, in a relative sense, the influence of contrast on the perception of human eyes is greater than that of brightness itself.

Taking the VA display mode as an example, the brightness of the liquid crystal display panel is determined by the electrical voltage applied to two ends of liquid crystal molecules. The greater the electrical voltage is, the brighter a pixel will be. The electrical voltage applied to the two ends of the liquid crystal is determined by a potential difference between electrodes provided on the array substrate side and the color filter substrate side. Due to terrain difference of the film structures on the two sides of the array substrate and the color filter substrate, it is common that individual areas may demonstrate stronger electric field even the electrical voltage applied is identical and this would cause corner light leakage in a dark state, severely deteriorating the contrast of a product.

Figure 1:
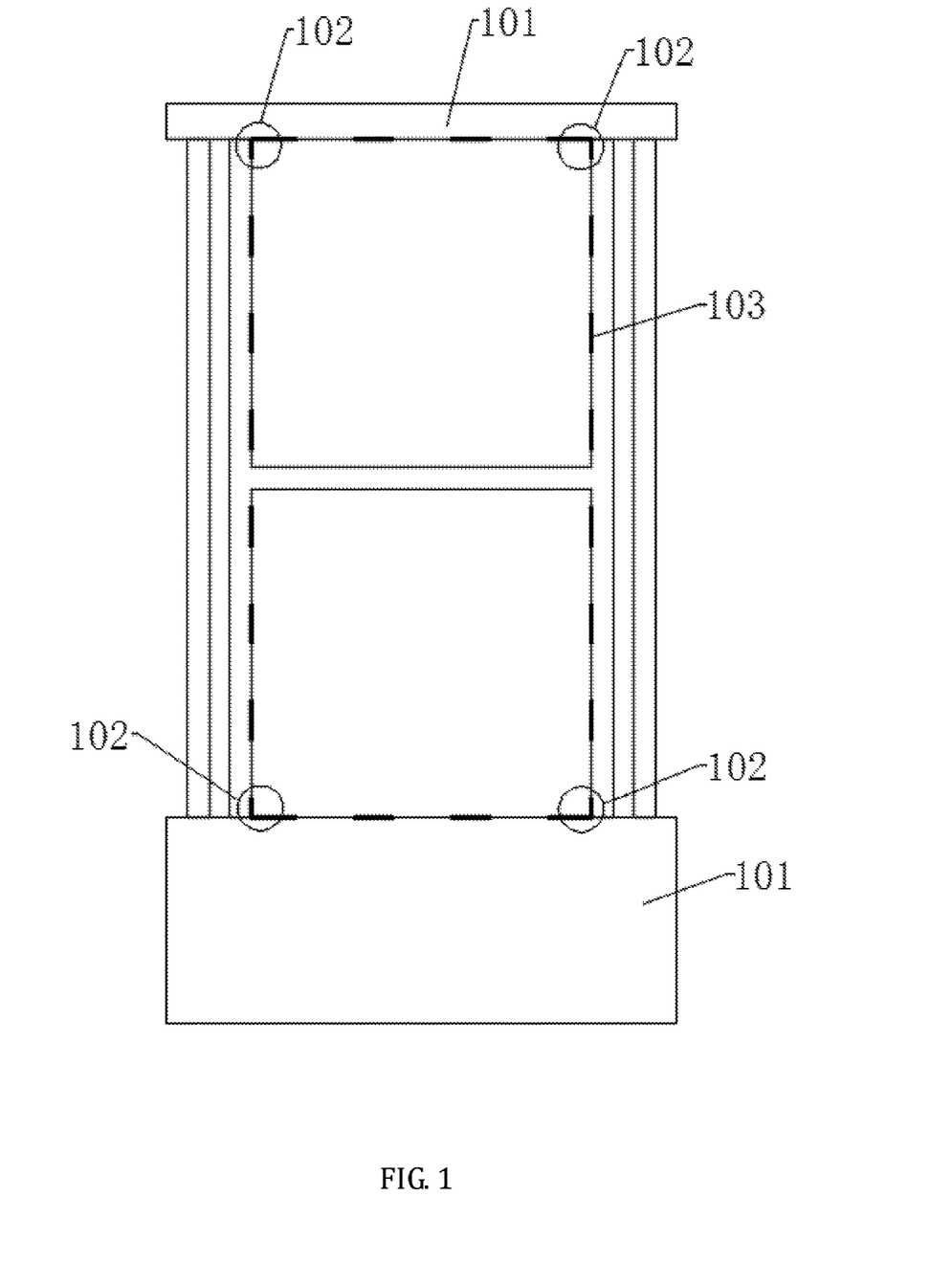
FIG. 1 is a schematic view illustrating a dark state of a pixel unit of a prior art liquid crystal display panel.
Figure 2:
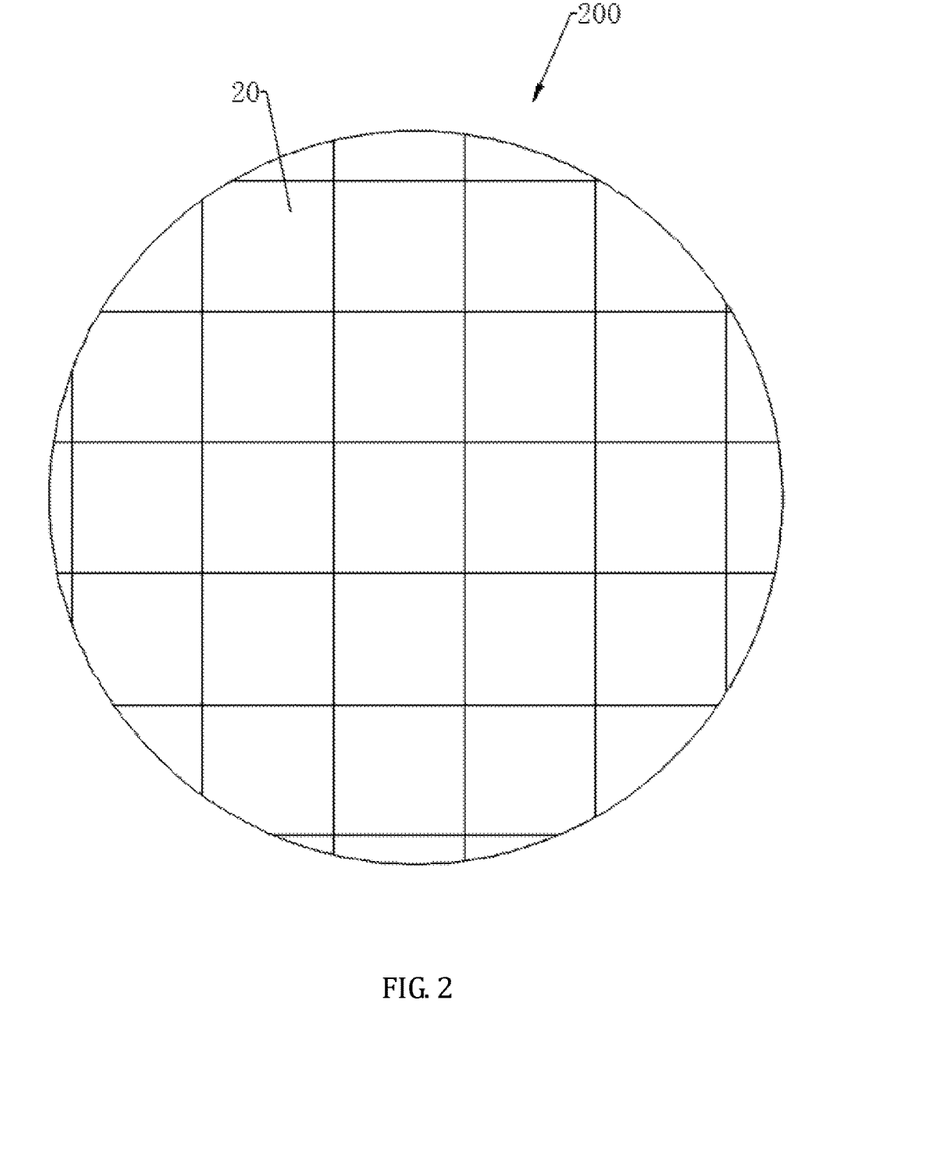
FIG. 2 is a schematic view illustrating a structure of a display panel according to an embodiment of the present invention.
Figure 3:
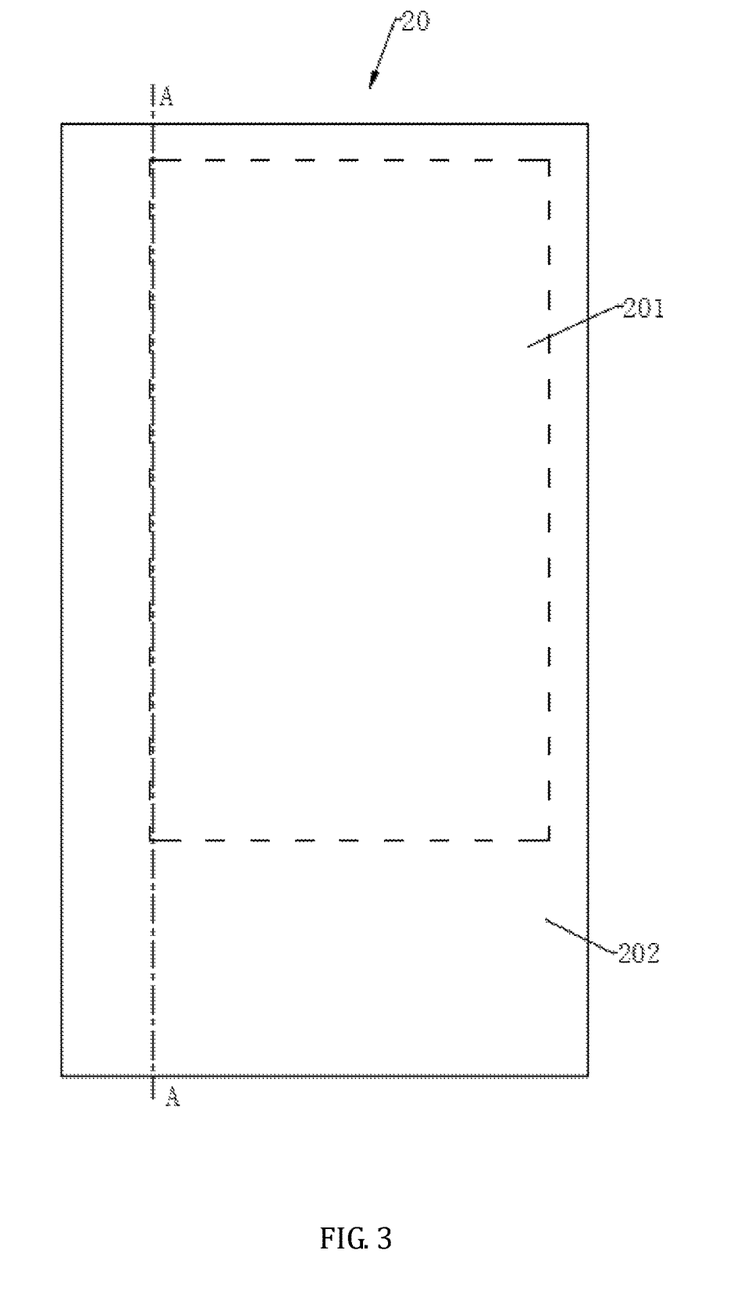
FIG. 3 is a schematic view illustrating a structure of pixel unit of the display panel shown in FIG. 2.

Taking a color-filter-on-array (COA, which is an integration technique that makes a color filter layer directly on an array substrate) liquid crystal display panel as an example, it comprises a first substrate and a second substrate that are opposite to each other. The second substrate comprises a color filter layer and a thin-film transistor device layer. The first substrate is formed with a black matrix (BM) and a conductive layer laid on the black matrix. Due the black matrix pattern, the conductive layer on the first substrate would demonstrate an up-and-down irregular structure. The second substrate is provided with a color resist layer that is generally of a great thickness so that a conductive layer (such as a pixel electrode) on the second substrate would be relatively flat. Upon application of an electric voltage to the conductive layer of the first substrate and the conductive layer of the second substrate, due to the difference of distance, the electric field may show different intensities in different areas, such that the intensity of the electric field is higher for areas where the distances between the two opposite conductive layers are shorter (such as the areas on the first substrate where the black matrix is provided) and the intensity of the electric field is lower for areas where the distances are longer. As shown in FIG. 1, since in the area where the electric field is stronger, the rotation of the liquid crystal molecules is greater, in a dark state of the liquid crystal display panel, an edge area (such as corners 102 of a light transmitting area 103) that corresponds to the black matrix 101 often suffers abnormality of electric field due to terrain variation and this leads to brightening and occurrences of light leakage.

SUMMARY OF THE INVENTION

The present invention provides a display panel and a display panel that demonstrate bettered displaying quality.

Embodiments of the present invention adopt the following technical solutions:

In one aspect, a display panel is provided, comprising a plurality of pixel units arranged in an array, each of the pixel units comprising light transmitting zone and a light shielding zone arranged on a circumference of the light transmitting zone;

wherein the display panel comprises a first substrate and a second substrate that are opposite to each other, the first substrate comprising a black matrix and a first common electrode that covers the black matrix, the black matrix being arranged in the light shielding zone, the second substrate comprising a plurality of main pixel electrode, the plurality of main pixel electrodes being arranged to correspond, in a one-to-one manner, to the plurality of pixel units and being opposite exactly to the light transmitting zones; and in each individual one of the pixel units, the black matrix has edges facing the light transmitting zone and provided with notches, the first common electrode having a first portion that covers the notches and is flush with a second portion thereof located in the light transmitting zone.

In the above display panel, a number of the notches that are provided in each individual one of the pixel units is plural and the plural notches being respectively arranged in multiple corners of the light transmitting zone.

In the above display panel, the second substrate further comprises a plurality of shielding blocks, the shielding blocks corresponding to the notches and covering the notches.

In the above display panel, the main pixel electrode and the shielding blocks are staggered with respect to each other in position.

In the above display panel, the second substrate further comprises a second common electrode, the second common electrode and the black matrix intersecting each other to circumferentially enclose the light transmitting zone.

In the above display panel, the shielding blocks and the second common electrode are arranged at the same layer.

In the above display panel, the shielding blocks are connected to the second common electrode.

In the above display panel, the second substrate further comprises a plurality of sub pixel electrodes, the plurality of sub pixel electrodes corresponding to the plurality of pixel units in a one to one manner, and in each individual one of the pixel units, the sub pixel electrode is electrically connected to the main pixel electrode, the sub pixel electrode being located in the light shielding zone and is separated from the shielding block.

In the above display panel, the shielding blocks and the sub pixel electrode are arranged in the same layer.

In another aspect, a display device is provided, comprising the above-described display panel.

In the embodiments of the present invention, the first portion of the first common electrode that covers the notches is substantially flush with the second portion thereof that is located in the light transmitting zone and the notches are arranged in areas where light leaking may be readily caused by a stronger intensity of electric field in the prior art so that the arrangement of the notches helps increase a spacing distance between the first portion and the main pixel electrode to make the spacing distance between the first portion and the main pixel electrode not less than a spacing distance between the second portion and the main pixel electrode and to make an intensity of electric field between the first portion and the main pixel electrode not greater than an intensity of electric field between the second portion and the main pixel electrode, and as such, light leaking occurring at a circumference of the light transmitting zone resulting from distribution variation of electric field can be avoided, providing the display panel and the display device with bettered displaying quality.

BRIEF DESCRIPTION OF THE DRAWINGS

To more clearly explain the technical solution of the present invention, a brief description of the drawings that are necessary for embodiments of the present invention is given as follows. It is obvious that the drawings that will be described below show only some embodiments of the present invention. For those having ordinary skills of the art, other drawings may be available from these attached drawings without the expense of creative effort and endeavor.

DETAILED DESCRIPTION OF THE PREFERRED EMBODIMENTS

A description will be given to technical solutions provided by embodiments of the present invention with reference to the attached drawings of the embodiments of the present invention. However, the embodiments so described are only some, but not all, of the embodiments of the present invention. Other embodiments that are available to those having ordinary skills of the art based on the embodiment of the present invention, without the expense of creative effort and endeavor, are considered belonging to the scope of protection of the present invention.

In addition, the description given below for each embodiment is made with reference to the attached drawings to exemplify specific embodiments that the present invention may be put into practice. Direction related terminology used in the present invention, such as "up", "down", "front", "rear", "left", "right", "internal", "external", and "lateral", is provided as direction defined in the drawing sheets. Thus, using the direction related terminology, which is for better and more clearly describing and understanding of the present invention and is not for indicating or implying any specific orientation that a device or an element described must take or the device or element must be structured or operated at a specific orientation, should thus be appreciated as not imposing constraints to the present invention.

In the description of the present invention, it should be noted that unless specifically required and set, the terms "installation", "connection", "jointing", and "disposed on . . ." as used herein should be interpreted in a broad way, such as being fixedly connected or removably connected, or integrally connected; or being mechanically connected; or being directly connected, or indirectly connected with intervening media therebetween, or interiors of two element being in communication with each other. For those having ordinary skills in the art, the specific meaning of these terms used in the present invention can be appreciated for any actual situations.

Further, in the description of the present invention, unless stated otherwise, "multiple" means two or more than two. Terms related to "operations", if used in this specification, should means independent operations and for cases where distinction from other operations, any operation that achieve a desired effect of the operation is included in the terms so used. Further, the symbol "-" as used in this specification stands for a numeral range, which comprises a range of which the minimum and the maximum are respectively the figures set in front of and behind "-". In the drawings, units having similar or the same structure are designated with the same reference numerals.

Referring collectively to FIGS. 2-5, the present invention provides, in an embodiment, a display device, which is applicable to various terminal devices, such as a mobile phone, a computer, a tablet computer, and a television. The display device comprises a display panel 200 and a backlight module. The backlight module functions to provide backlighting to the display panel 200.

The display panel 200 comprises a plurality of pixel units 20 arranged in an array. Each of the pixel units 20 comprises a light transmitting zone 201 and a light shielding zone 202 arranged on a circumference of the light transmitting zone 201. The light shielding zone 202 encloses the light transmitting zone 201.

The display panel 200 comprises a first substrate 1 and a second substrate 2 that are opposite to each other. A liquid crystal (LC) layer 3 is interposed between the first substrate 1 and the second substrate 2. The first substrate 1 comprises a black matrix 11 and a first common electrode 12 that covers the black matrix 11. The first common electrode 12 has a structure in the form of a layer. The first common electrode 12 covers both the light shielding zone 202 and the light transmitting zone 201. The black matrix 11 is arranged in the light shielding zone 202 to provide an effect of shielding light. The black matrix 11 and a non-light-transmitting metallic electrode provided on the second substrate 2 collectively form the light shielding zone 202.

The second substrate 2 comprises a plurality of main pixel electrodes 21. The plurality of main pixel electrodes 21 are arranged to correspond, in a one-to-one manner, to the plurality of pixel units 20 and are opposite exactly to the light transmitting zones 201. The main pixel electrodes 21 cover the light transmitting zones 201. The second substrate 2 further comprises multiple gate lines 22 and multiple data lines 23. The multiple gate lines 22 and the multiple data lines 23 intersect each other to define the plurality of pixel units 20. The second substrate 2 further comprises a color filter (CF) layer 24. The color filter layer 24 comprises color resist blocks of multiple colors, such as red color resist block, green color resist block, and blue resist block. The plurality of main pixel electrodes 21 are arranged on one side of the color filter layer 24 that faces the liquid crystal layer 3. The plurality of main pixel electrodes 21 are formed, in a planar form, on the color filter layer 24.

In each individual one of the pixel units 20, the black matrix 11 has edges facing the light transmitting zone 201 and provided with notches 111. The notches 111 are set at locations corresponding to areas where light leaking may occur in a known pixel unit 20 (such as a circumference of the light transmitting zone 201). A first portion 121 of the first common electrode 12 that covers the notches 111 is substantially flush with a second portion 122 thereof located in the light transmitting zone 201.

In the instant embodiment, the first portion 121 of the first common electrode 12 that covers the notches 111 and the second portion 122 thereof that is located in the light transmitting zone 201 are flush with each other and the notches 111 are arranged in areas where light leaking may be readily caused by a stronger intensity of electric field in the prior art so that the arrangement of the notches 111 helps increase a spacing distance between the first portion 121 and the main pixel electrode 21 to make the spacing distance between the first portion 121 and the main pixel electrode 21 not less than a spacing distance between the second portion 122 and the main pixel electrode 21 and to make an intensity of electric field between the first portion 121 and the main pixel electrode 21 not greater than an intensity of electric field between the second portion 122 and the main pixel electrode 21, and as such, light leaking occurring at a circumference of the light transmitting zone 201 resulting from distribution variation of electric field can be avoided, providing the display panel 200 and the display device with bettered displaying quality.

It is appreciated that due to the main pixel electrode 21 being arranged to exactly opposite to and thus covering the light transmitting zone 201 and the second portion 122 being located in the light transmitting zone 201, the main pixel electrode 21 is arranged exactly opposite to and covering the second portion 122 and the spacing distance between the main pixel electrode 21 and the second portion 122 is a perpendicular distance between the two. In a case that the main pixel electrode 21 also covers the notches 111, the spacing distance between the main pixel electrode 21 and the first portion 121 is the perpendicular distance between the two and in a case that the main pixel electrode 21 does not cover the notches 111, the spacing distance between the main pixel electrode 21 and the first portion 121 is greater than a perpendicular distance between the two, so that the spacing distance between the first portion 121 and the main pixel electrode 21 is not greater than (namely less than or equal to) the spacing distance between the second portion 122 and the main pixel electrode 21.

Figure 5:
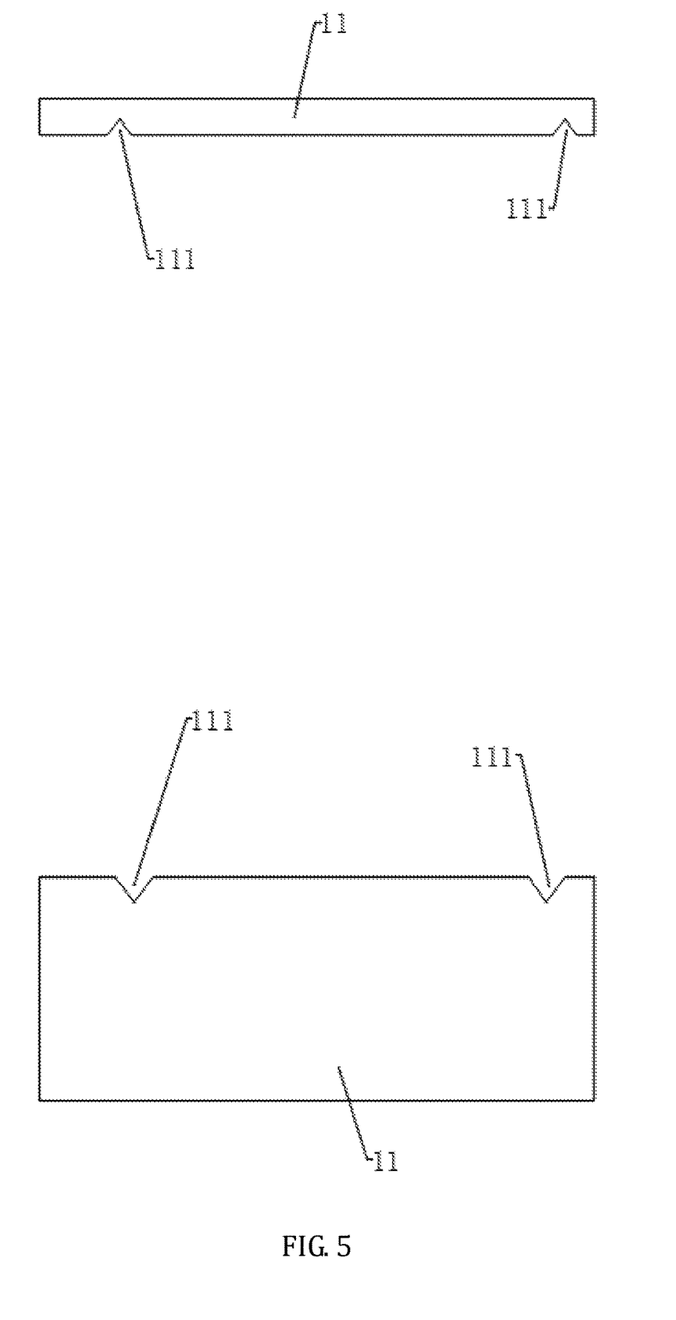
FIG. 5 is a schematic view illustrating a structure of a black matrix of a first substrate of the display panel shown in FIG. 2.

Optionally, in each individual one of the pixel units 20, the number of the notches 111 involved is plural and the plural notches 111 are respectively arranged and formed in multiple corners of the light transmitting zone 201. Since the corners of the light transmitting zone 201 are sites having the greatest potential risk of light leaking, arranging the notches 111 at such locations may help reduce the risk of light leaking in the display panel 200. For example, the number of the notches 111 involved may be four and are respectively arranged to correspond to four corners of the light transmitting zone 201.

It is appreciated that the notches 111 used may be notches 111 having a triangular configuration, or may each alternatively be an elongate strip, and can be arranged according to light emission conditions of a product.

Figure 4:
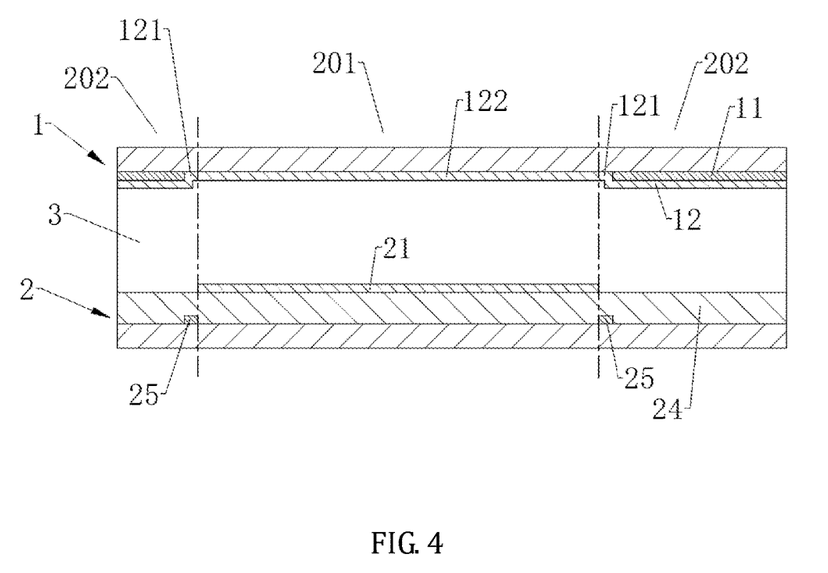
FIG. 4 is a schematic view illustrating a structure of a section taken along line A-A of FIG. 3.

Referring collectively to FIGS. 3-9, as an optional embodiment, the second substrate 2 may further comprise a plurality of shielding blocks 25. The shielding blocks 25 are arranged to correspond to the notches 111 and covers the notches 111. FIG. 4 is a schematic view illustrating a structure of a section taken along line A-A of FIG. 3, wherein the line A-A passes through the notches 111 and the shielding blocks 25. The second substrate 2 is only shown with a portion of the film layers thereof in FIG. 4, while the remaining film layers, such as a thin-film transistor device layer, a sub pixel electrodes layer, a second common electrode layer, and the others, are not shown.

In the instant embodiment, the plurality of shielding blocks 25 are provided to shield light at the sites of the notches 111 so as to prevent light leaking occurring in the light shielding zone 202. The shielding blocks 25 are made of a non-light-transmitting material, such as a metal.

Optionally, the main pixel electrode 21 and the shielding blocks 25 are staggered with respect to each other in position. Since the film layer structure in which the shielding blocks 25 are located are relatively high, the main pixel electrode 21 can be arranged to deviate from the shielding blocks 25 to help prevent rotation of liquid crystal from being interfered with by a sideway electric field induced by terrain variation of the film layer structure to thus ensure consistency of spacing distance between the main pixel electrode 21 and the second portion 122 of the common electrode and consistent distribution of electric field between the main pixel electrode 21 and the second portion 122.

In the instant embodiment, the main pixel electrode 21 and the notches 111 are also staggered with respect to each other in position; the main pixel electrode 21 and the first portion 121 of the common electrode are staggered with respect to each other in position, so that the intensity of electric field between the main pixel electrode 21 and the first portion 121 could be further reduced.

Referring collectively to FIGS. 6-9, as an optional embodiment, the second substrate 2 may further comprise a second common electrode 26. The second common electrode 26 and the black matrix 11 are arranged to intersect to circumferentially enclose the light transmitting zone 201. The second common electrode 26 is made of a metallic material. The second common electrode 26 is not light transmitting. The second common electrode 26 and the gate lines 22 are arranged at the same layer.

Figure 6:
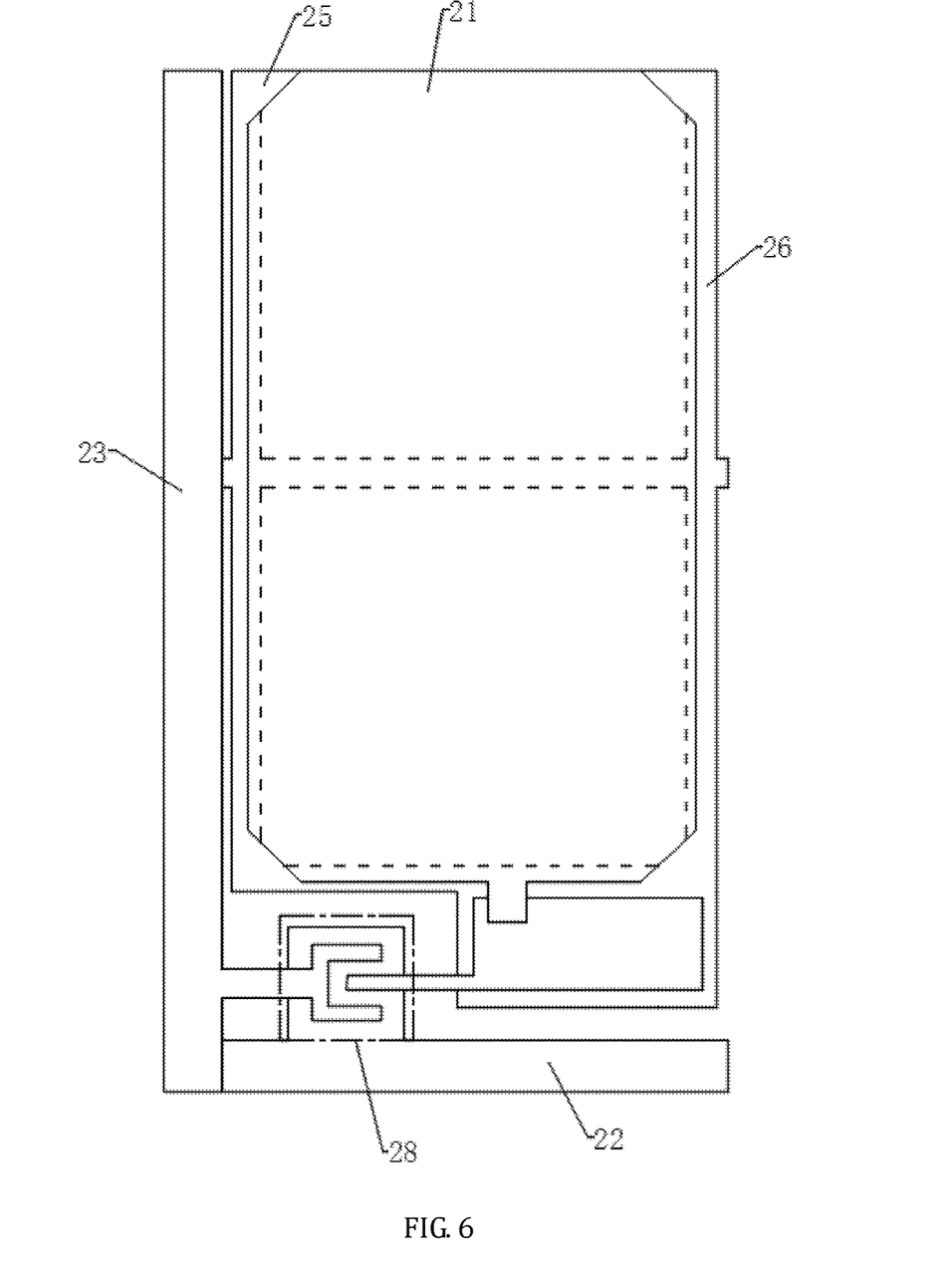
FIG. 6 is a schematic view illustrating a structure of an embodiment of a second substrate of the display panel shown in FIG. 2.
Figure 7:
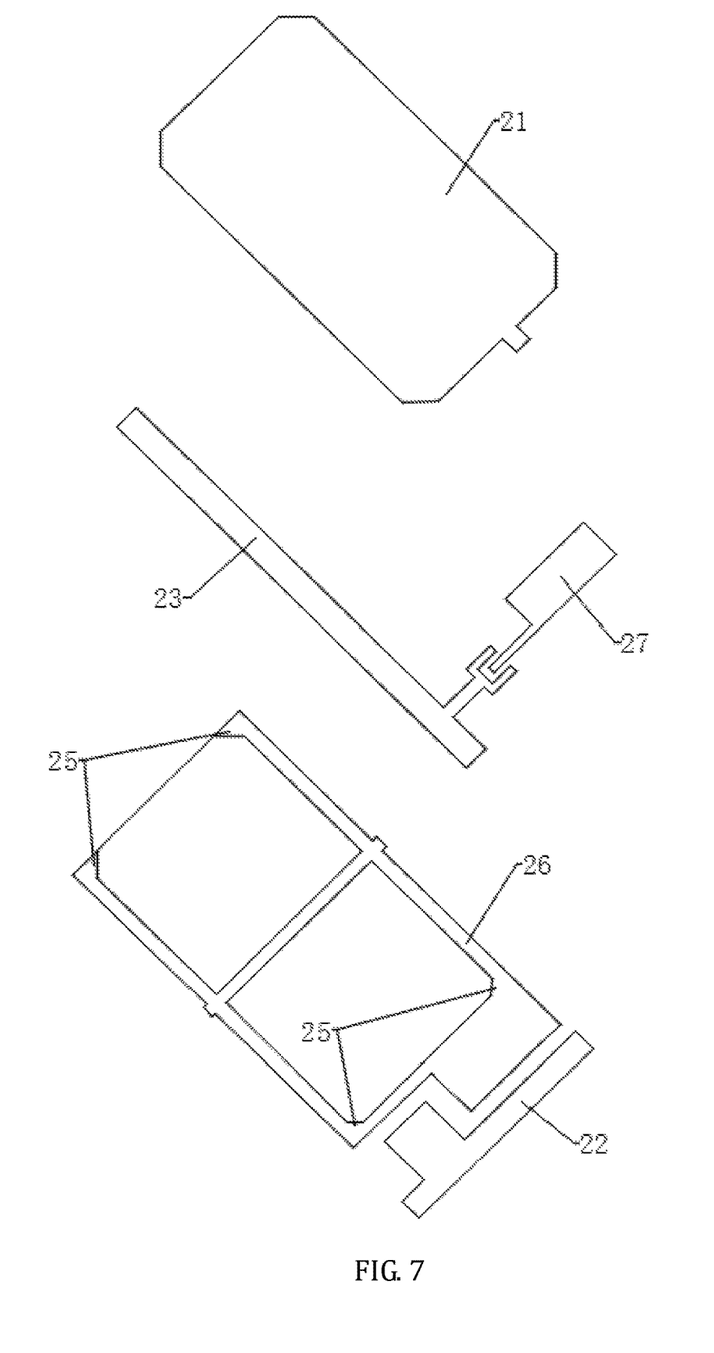
FIG. 7 is an exploded view of the second substrate shown in FIG. 6
Figure 7A:
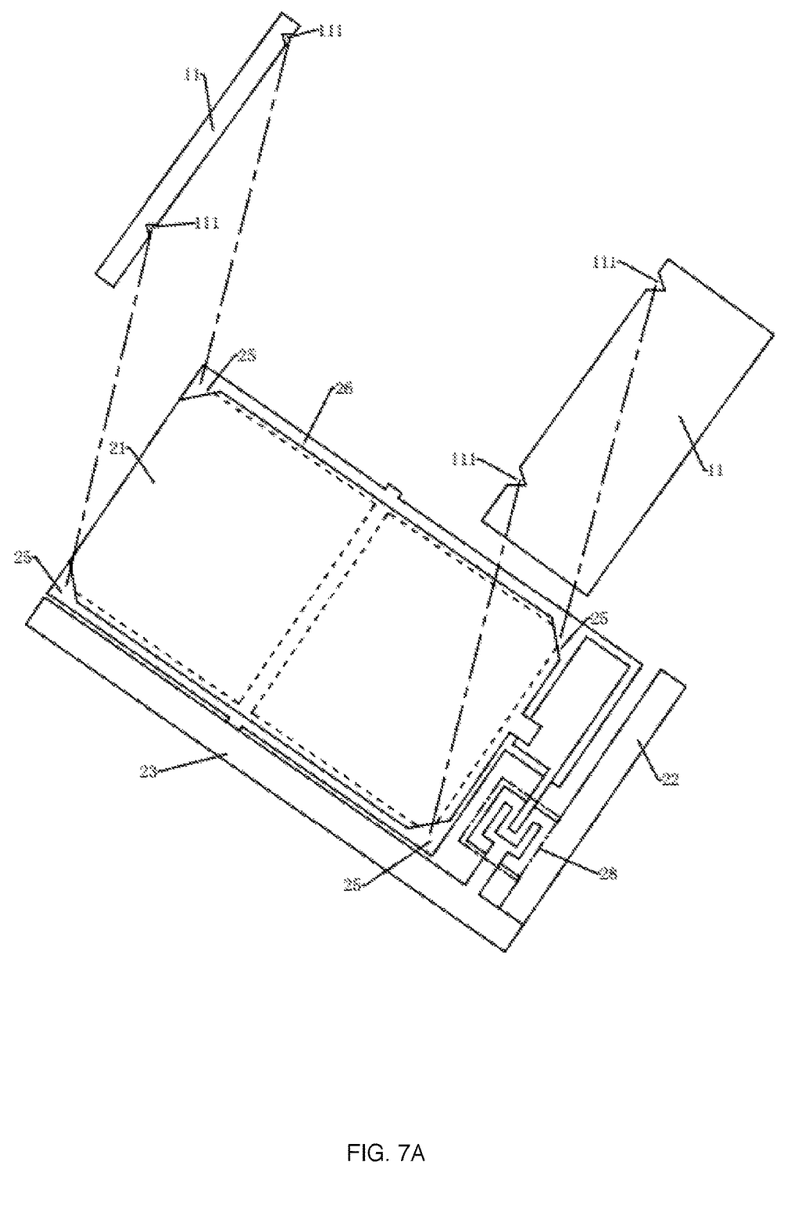
FIG. 7A is an assembled view of FIG. 7 with a black matrix added and a main pixel electrode removed.

Optionally, as shown in FIGS. 6 and 7, the shielding blocks 25 and the second common electrode 26 are arranged on the same layer. Under this condition, the shielding blocks 25 and the second common electrode 26 can be made of the same material through the same etching process in order to reduce the fabrication cost of the display panel 200.

Optionally, the shielding blocks 25 are connected to the second common electrode 26. Under this condition, since the shielding blocks 25 are connected to the second common electrode 26, difficulty of processing of the shielding blocks 25 can be reduced and the sturdiness of the shielding blocks 25 is also improved.

Referring to FIGS. 6-9, as an optional embodiment, the second substrate 2 may further comprise a plurality of sub pixel electrodes 27. The plurality of sub pixel electrodes 27 and the plurality of pixel units 20 correspond to each other in a one to one manner. In each individual one of the pixel units 20, the sub pixel electrode 27 is electrically connected to the main pixel electrode 21, and the sub pixel electrode 27 is located in the light shielding zone 202 and is spaced from the shielding blocks 25. The shielding blocks 25 and the sub pixel electrode 27 are separated from each other by means of an insulation layer to realize isolation from each other. The sub pixel electrode 27 and the data lines 23 are arranged on the same layer.

Figure 8:
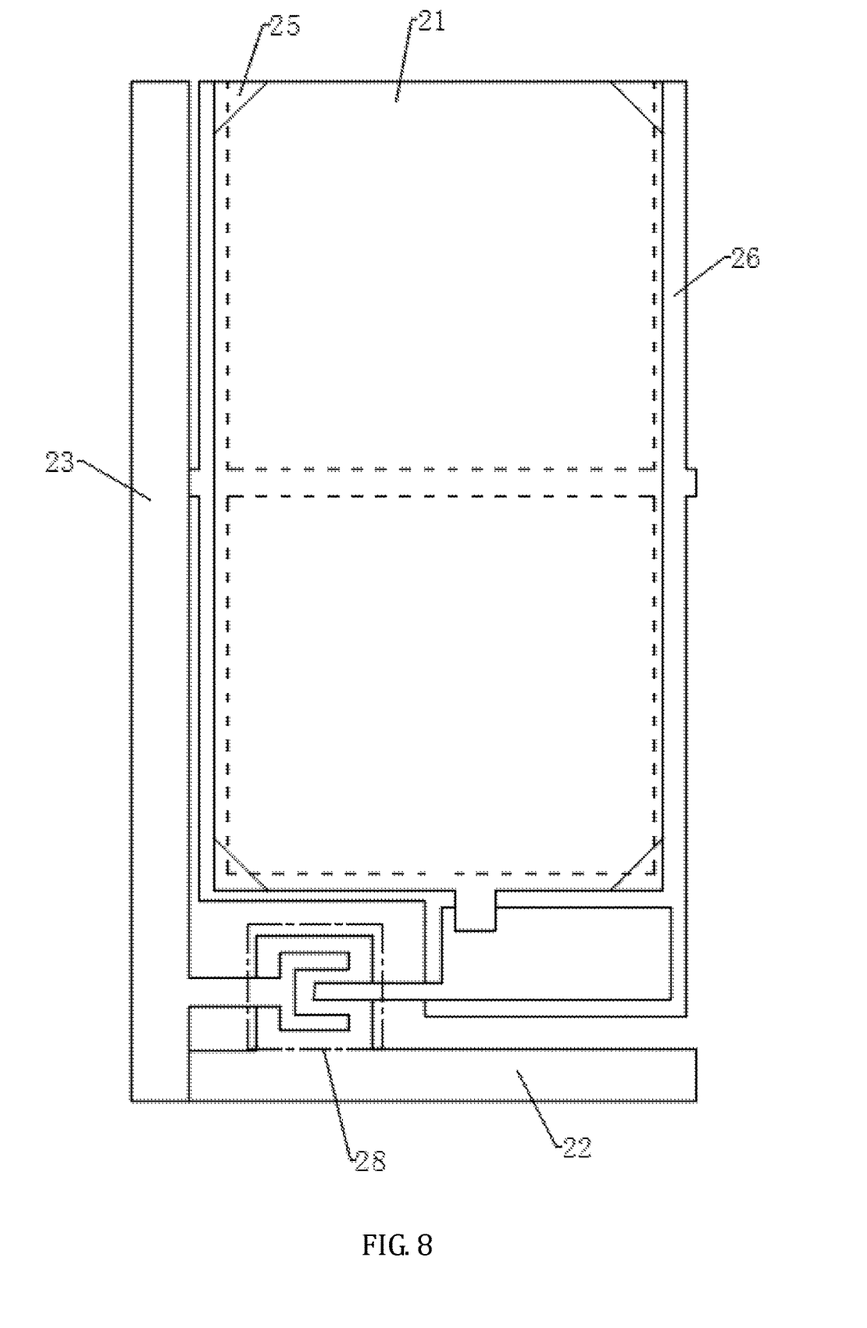
FIG. 8 is a schematic view illustrating a structure of another embodiment of a second substrate of the display panel shown in FIG. 2.
Figure 9:
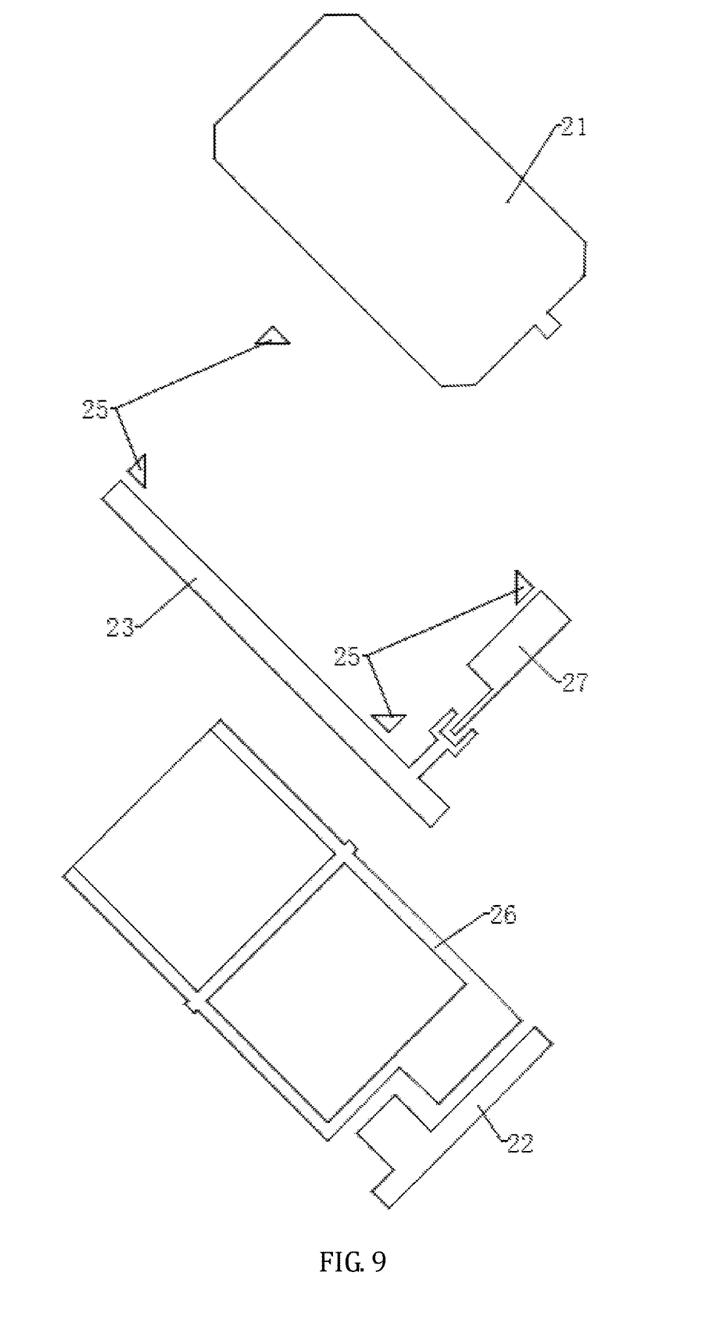
FIG. 9 is an exploded view of the second substrate shown in FIG. 8.

Optionally, as shown in FIGS. 8 and 9, the shielding blocks 25 and the sub pixel electrode 27 may be arranged on the same layer. Under such a condition, the shielding blocks 25 and the sub pixel electrodes 27 can be made of the same material through the same etching process so as to reduce the fabrication cost of the display panel 200.

Referring to FIGS. 6-9, as an optional embodiment, the second substrate 2 may further comprise a plurality of thin-film transistors 28. The plurality of thin-film transistors 28 and the plurality of pixel units 20 correspond to each other in a one to one manner. In each individual one of the pixel units 20, the thin-film transistor 28 comprises a gate electrode that is in the same layer as the gate lines 22 and is electrically connected to the gate lines 22. The thin-film transistor 28 has a source electrode that is in the same layer as the data lines 23 and is electrically connected to the data lines 23. The thin-film transistor 28 has a drain electrode that is in the same layer as the source electrode of the thin-film transistor 28, the sub pixel electrode 27 and the drain electrode of the thin-film transistor 28 is electrically connected to the sub pixel electrode 27.

The above provides a detailed description of embodiments of the present invention. Specific examples are used in the specification to expound the principle and embodying ways of the present invention. The description of the embodiments is provided to help understanding of the method of the present invention, as well as the essential idea thereof. Further, for those having ordinary skills in the art, it can be contemplated to make modifications, based on the idea of the present invention, on the embodiments and applications thereof. In conclusion, the specification should not be interpreted as constraints to the scope of the present invention.

What is claimed is:

1. A display panel, comprising a plurality of pixel units arranged in an array, each of the pixel units comprising light transmitting zone and a light shielding zone arranged on a circumference of the light transmitting zone;

wherein the display panel comprises a first substrate and a second substrate that are opposite to each other, the first substrate comprising a black matrix and a first common electrode that covers the black matrix, the black matrix being arranged in the light shielding zone, the second substrate comprising a plurality of main pixel electrodes, the plurality of main pixel electrodes being arranged to correspond, in a one-to-one manner, to the plurality of pixel units and respectively facing the light transmitting zones; and in each individual one of the pixel units, the black matrix has edges facing the light transmitting zone and provided with notches, the first common electrode having a first portion that covers the notches and is flush with a second portion thereof located in the light transmitting zone; wherein the black matrix has a proximal surface that is positioned on a lower surface of the first substrate and a distal surface that is opposite to and parallel with the proximal surface and is distant from the lower surface of the first substrate; the edges of the black matrix being perpendicularly connected between the proximal surface and the distal surface facing the light transmitting zone; the notches being formed in the edges and extending through both the proximal surface and the distal surface, wherein the surface of the first substrate is party covered by the black matrix such that a first part of the surface of the first substrate corresponding to the light transmitting zone is exposed and second parts of the surface of the first substrate that correspond to the notches are exposed through the notches that extend through both the proximal and distal surfaces of the black matrix;

wherein the first common electrode is formed on both the distal surface of the black matrix and the first part and second parts of the surface of the first substrate, such that the second portion of the first common electrode covers the first part of the surface of the first substrate and is located in the light transmitting zone and a first portion of the first common electrode that covers the notches is set in the notches to cover the second parts of the surface of the first substrate and flush with the second portion.

2. The display panel according to claim 1, wherein a number of the notches that are provided in each individual one of the pixel units is plural and the plural notches being respectively arranged in multiple corners of the light transmitting zone.

3. The display panel according to claim 1, wherein the second substrate further comprises a plurality of shielding blocks, the shielding blocks corresponding to the notches and covering the notches.

4. The display panel according to claim 3, wherein the main pixel electrode and the shielding blocks are staggered with respect to each other in position.

5. The display panel according to claim 3, wherein the second substrate further comprises a second common electrode, the second common electrode and the black matrix intersecting each other to circumferentially enclose the light transmitting zone.

6. The display panel according to claim 4, wherein the second substrate further comprises a second common electrode, the second common electrode and the black matrix intersecting each other to circumferentially enclose the light transmitting zone.

7. The display panel according to claim 5, wherein the shielding blocks and the second common electrode are arranged at the same layer.

8. The display panel according to claim 7, wherein the shielding blocks are connected to the second common electrode.

9. The display panel according to claim 3, wherein the second substrate further comprises a plurality of sub pixel electrodes, the plurality of sub pixel electrodes corresponding to the plurality of pixel units in a one to one manner, and in each individual one of the pixel units, the sub pixel electrode is electrically connected to the main pixel electrode, the sub pixel electrode being located in the light shielding zone and is separated from the shielding block.

10. The display panel according to claim 9, wherein the shielding blocks and the sub pixel electrode are arranged in the same layer.

11. A display device, comprising a display panel, the display panel comprising a plurality of pixel units arranged in an array, each of the pixel units comprising light transmitting zone and a light shielding zone arranged on a circumference of the light transmitting zone;

wherein the display panel comprises a first substrate and a second substrate that are opposite to each other, the first substrate comprising a black matrix and a first common electrode that covers the black matrix, the black matrix being arranged in the light shielding zone, the second substrate comprising a plurality of main pixel electrodes, the plurality of main pixel electrodes being arranged to correspond, in a one-to-one manner, to the plurality of pixel units and respectively facing the light transmitting zones; and in each individual one of the pixel units, the black matrix has edges facing the light transmitting zone and provided with notches, the first common electrode having a first portion that covers the notches and is flush with a second portion thereof located in the light transmitting zone; wherein the black matrix has a proximal surface that is positioned on a lower surface of the first substrate and a distal surface that is opposite to the and parallel with the proximal surface and is distant from the lower surface of the first substrate; the edges of the black matrix being perpendicularly connected between the proximal surface and the distal surface facing the light transmitting zone; the notches being formed in the edges and extending through both the proximal surface and the distal surface, wherein the surface of the first substrate is party covered by the black matrix such that a first part of the surface of the first substrate corresponding to the light transmitting zone is exposed and second parts of the surface of the first substrate that correspond to the notches are exposed through the notches that extend through both the proximal and distal surfaces of the black matrix;

wherein the first common electrode is formed on both the distal surface of the black matrix and the first part and second parts of the surface of the first substrate, such that the second portion of the first common electrode covers the first part of the surface of the first substrate and is located in the light transmitting zone and a first portion of the first common electrode that covers the notches is set in the notches to cover the second parts of the surface of the first substrate and flush with the second portion.

12. The display device according to claim 11, wherein a number of the notches that are provided in each individual one of the pixel units is plural and the plural notches being respectively arranged in multiple corners of the light transmitting zone.

13. The display device according to claim 11, wherein the second substrate further comprises a plurality of shielding blocks, the shielding blocks corresponding to the notches and covering the notches.

14. The display device according to claim 13, wherein the main pixel electrode and the shielding blocks are staggered with respect to each other in position.

15. The display device according to claim 13, wherein the second substrate further comprises a second common electrode, the second common electrode and the black matrix intersecting each other to circumferentially enclose the light transmitting zone.

16. The display device according to claim 14, wherein the second substrate further comprises a second common electrode, the second common electrode and the black matrix intersecting each other to circumferentially enclose the light transmitting zone.

17. The display device according to claim 15, wherein the shielding blocks and the second common electrode are arranged at the same layer.

18. The display device according to claim 17, wherein the shielding blocks are connected to the second common electrode.

19. The display device according to claim 13, wherein the second substrate further comprises a plurality of sub pixel electrodes, the plurality of sub pixel electrodes corresponding to the plurality of pixel units in a one to one manner, and in each individual one of the pixel units, the sub pixel electrode is electrically connected to the main pixel electrode, the sub pixel electrode being located in the light shielding zone and is separated from the shielding block.

20. The display device according to claim 19, wherein the shielding blocks and the sub pixel electrode are arranged in the same layer.

* * * * *